United States Patent
Zhou et al.

(10) Patent No.: US 10,838,219 B2
(45) Date of Patent: Nov. 17, 2020

(54) LIGHT APPARATUS FOR GENERATING LIGHT BEAMS WITH MULTIPLE LENS

(71) Applicant: XIAMEN ECO LIGHTING CO. LTD., Xiamen (CN)

(72) Inventors: Yaling Zhou, Xiamen (CN); Xiaoming Yang, Xiamen (CN); Dejuan Liang, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 16 days.

(21) Appl. No.: 15/927,082

(22) Filed: Mar. 21, 2018

(65) Prior Publication Data
US 2019/0297691 A1 Sep. 26, 2019

(51) Int. Cl.
*F21V 5/04* (2006.01)
*G02B 27/09* (2006.01)

(52) U.S. Cl.
CPC .......... *G02B 27/0955* (2013.01); *F21V 5/045* (2013.01)

(58) Field of Classification Search
CPC ........ F21Y 2115/10; F21V 5/04; F21V 5/043; F21V 5/045; F21V 7/0091; G02B 3/02; G02B 3/04; G02B 3/06; G02B 3/08; F21K 9/69
See application file for complete search history.

(56) References Cited

U.S. PATENT DOCUMENTS

| | | | | |
|---|---|---|---|---|
| 6,724,543 B1* | 4/2004 | Chinniah | | F21V 5/008 359/718 |
| 6,755,556 B2* | 6/2004 | Gasquet | | F21V 5/04 362/329 |
| 7,222,995 B1* | 5/2007 | Bayat | | F21L 4/027 362/327 |
| 7,837,349 B2* | 11/2010 | Chinniah | | F21V 5/04 362/244 |
| 8,068,288 B1* | 11/2011 | Pitou | | G02B 3/08 359/743 |
| 8,833,981 B2* | 9/2014 | Bailey | | F21V 13/04 362/311.02 |
| 10,174,918 B2* | 1/2019 | Li | | F21V 27/02 |
| 2011/0080736 A1* | 4/2011 | Brands | | F21V 5/006 362/277 |
| 2018/0058666 A1* | 3/2018 | Huang | | F21V 14/06 |

* cited by examiner

*Primary Examiner* — Robert J May
(74) *Attorney, Agent, or Firm* — Chung-Ming Shih; LanWay IPR Services

(57) ABSTRACT

A light apparatus for providing a light beam contains a driver circuit, a LED plate, a central lens, a surrounding lens. The LED plate has a luminous area to emit light. The central lens has a bottom surface and a top surface. The bottom surface of the central lens faces to the luminous area. The top surface has multiple lens. The surrounding lens has a surrounding surface connecting to and surrounding the top surface of the central lens. The surrounding lens has a lateral part gradually climbing upwardly away from the luminous area. There are multiple refraction lens disposed on the lateral part.

18 Claims, 8 Drawing Sheets

LIGHT APPARATUS FOR GENERATING LIGHT BEAMS WITH MULTIPLE LENS

FIELD OF INVENTION

The present invention is related to a light apparatus and more particularly related to a light apparatus that generates a light beam.

BACKGROUND

LED (Light Emitted Diode) devices are popular in recent years. Not only traditional light bulbs are widely replaced by LED bulbs, spotlight and other devices also welcome LED technologies.

Spotlight devices are widely used in various areas, including to better show a painting or a portion of a dinner table. However, spotlight devices usually takes higher price and thus making them less adopted than needed. Current spotlight devices usually have more complicated structures and thus make them having higher cost.

Some downlight devices also need to focus emitted light to generate a focused light beam. The light beam means a relative focused light is generated to emphasize a particular object, instead of emitting environmental soft light.

For spot light devices, downlight devices, or other light devices that are required to emit a light beam, various lens are necessary for meeting different needs. In addition, when LED source is not a point light but a luminous area, it is more difficult to optimize overall light output and nice light beam effect. It is also difficult to decrease lens thickness, though decreasing lens thickness may reduce manufacturing cost and overall product size.

Therefore, it would be a technical challenge to study structures of light devices that generate light beams and enhance their components and structures.

SUMMARY OF INVENTION

According to an embodiment of the present invention, a light apparatus has a driver circuit, a LED plate, a central lens and a surrounding lens.

The LED plate is connected to the driver circuit for getting a power supply to emit light via a luminous area. The luminous area may refer to a multiple discrete LED modules located in different positions and may also refer to a continuous or multiple continuous areas filled with closely arranged LED modules. Even each LED chip may have a 120 degree emitting angle, when multiple LED chips are put together in an luminous area, the light paths become much more difficult to design, particularly in the case for forming a light beam with desired angle. In addition, even a light beam is generated with a desired beam angle, there may be certain amount of light wasted inside a lens, which may cause additional heat that is easily accumulated and may damage the LED modules or internal circuits to decrease life span of light devices.

In the embodiment, the central lens has a bottom surface and a top surface. The bottom surface faces the luminous area and the top surface is a major part where light from the luminous escapes from the light apparatus.

In addition, the bottom surface of the central lens faces to the luminous area. In some embodiments, the luminous area has smaller size than the bottom surface of the central lens and completely covers under the central lens. In some other embodiments, the central lens has a similar size as the luminous area. In some other embodiments, there are multiple luminous areas and there may be several central lens respectively located above and covering these luminous areas.

The top surface of the central lens has a plurality of convex lens structures for guiding light emitted from the luminous area. In other words, there may be more than one, e.g. a lot of micro lens structure or several, e.g. 5 to 30, convex lens structures arranged on the top surface of the central lens.

The surrounding lens has a surrounding surface connecting to and surrounding the top surface of the central lens. In some embodiments, the surrounding lens surround the central lens. When there are several central lens, the surrounding lens may respectively surround the multiple central lens.

The surrounding surface of the surrounding lens has an internal boundary connected to the top surface of the central lens. The surrounding lens has a lateral part gradually climbing upwardly away from the luminous area to reach an external boundary of the surrounding surface. This means that when the luminous is located below the surrounding lens and the central lens. The surrounding surface of the surrounding lens gets increasing height gradually from internal boundary that surrounds the central lens to the external boundary. In some embodiments, such features form a cup structure In addition, a plurality of refraction lens are disposed on the lateral part for guiding light emitted from the luminous area. In previous cup example, the cup has multiple refraction lens arranged in the inner surface of the cup.

The central lens and the surrounding lens are used for guiding light of the luminous area to form the light beam.

In some embodiments, the multiple lens on the lateral part of the surrounding lens are substantially parallel to each other. For example, multiple refraction lens have similar shape but have different diameters. Refraction lens with larger diameters surrounds the refraction lens with smaller diameters.

In such case, since these refraction lens generally do not have cross points in their extending matter, these refraction lens are substantially parallel to each other. In such embodiments, the plurality of refraction lens are substantially parallel to each other.

In some embodiments, furthermore, the plurality of refraction lens form a plurality of ladders on the surrounding surface of the surrounding lens. In other words, there are ladder-like surrounding structures arranged one circle after another to form a plurality of steps in the lateral part of the surrounding lens.

In some embodiments, the plurality of convex lens of the central lens are substantially parallel to each other. Like mentioned above for surrounding lens, the multiple convex lens may have several parts and each part is parallel to other parts, which means basically there are no cross points between extending manners of these convex lens.

In some embodiments, furthermore, the refraction angles of the convex lens of the central lens arranged away from a middle of the central lens are different from refraction angles of the convex lens of the central lens arranged near the middle of the central lens.

For example, the refraction lens do not have the refraction angles. Instead, their refraction angles are corresponding to their positions relative to the luminous area below for optimizing overall light directions of the light apparatus.

In some embodiments, specifically, the heights of the convex lens of the central lens arranged away from a middle of the central lens are taller than heights of the convex lens of the central lens arranged near the middle of the central lens. For example, if the central lens is a circular shape with a central point. The refraction lens near the central point has lower height, less convex protruding heights, than the refraction lens far from the central point.

In some embodiments, the central lens and the surrounding lens are made of one piece plastic material. In such case, the combination of the central lens and the surrounding lens are made of a single piece component at beginning, e.g. to be made from the same injection molding device. There are currently several ways to manufacture desired luminous efficacy material with transparent plastic material using various manufacturing process, e.g. injection molding, press molding. In addition, the refraction lens and the convex lens on the surrounding lens and the central lens may be cut or generated with other manufacturing tools after making the main module.

In some other embodiments, the central lens and the surrounding lens are two separable modules. In other words, the central lens is combined with the surrounding lens during manufacturing. In such case, a different beam angle is achieved by combining one different central lens and one corresponding surrounding lens. In other words, to meet different light beam characteristic, e.g. different colors, different light beam angle, manufacturers may combine a surrounding lens with a central lens that together meet the required output characteristic.

This may further decrease manufacturing cost, because molding device is always an expensive cost for manufacturers. By using several predetermined standard surrounding lens and central lens, designers may develop various light devices with significant cost reduction.

In some embodiments, the light apparatus further has a cover part below the central lens defining a containing space and surrounding the luminous area in the containing space. For example, there is a cavity defined by cover part at bottom of the lens module facing and surrounding the luminous area.

In some embodiments, there may be a plurality of cover lens disposed on a surface of the cover part. In other words, there may multiple separate luminous areas and each luminous area is surrounded and covered by a corresponding cover part of the lens module.

In some embodiments, the cover part has a position structure to fix to a corresponding fixing unit of the LED plate to align the luminous area at a predetermined position with respect to the central lens and the surrounding lens. It is important to align the luminous area with the lens module so as to maximize the original design effect of the surrounding lens and the central lens, e.g. via adjustment after computer model simulation.

In some embodiments, the position structure has multiple positions to be selected to fix to the corresponding fixing unit of the LED plate to provide different relative distances between the luminous area and the central lens.

In such case, even the same surrounding lens and the central lens as well as the same luminous area are used, the overall light characteristic, like beam angle, may be adjusted by changing the relative position between the surrounding lens and the central lens with the luminous area, e.g. to place the luminous area more close to the central lens.

This helps increase flexibility of the light apparatus. Users may buy the same light apparatus and adjust the light beam to fit their specific needs by changing relative positions with the help for preinstalled position structures.

In some embodiments, the central lens and the surrounding lens form a lens component having an external lateral wall. The external lateral wall has multiple concave parts extended from a bottom of the lens component to a top of the lens component.

For example, when the central lens and surrounding lens are combined or originally as a one-piece component, the component has an external lateral wall. Take the previous cup-shape lens module as an example, the external lateral wall of the cup has multiple concave parts. Each concave part extends from the bottom of the cup and extends to the top of the cup, just like a flower with several petals extended from central of the flower.

In some embodiments, these concave parts of the external lateral walls form multiple reflection lens for reflecting light of the luminous area back to the lens module. In such case, when light emits to the external lateral wall, the light is reflected back to guide the light to go to a desired path to emit out of the light apparatus.

In some embodiments, the light apparatus may have a reflection component attaching and covering the lateral wall of the external lateral wall.

In some embodiments, the reflection component is a heat sink. In other words, the heat sink like a plastic or metal cup surrounds the lens module and helps perform heat dissipation of the lens module.

In some embodiments, the internal boundary and the external boundary of the surrounding lens have different geometric shapes. For example, the central lens may have a circular shape while the external boundary of the surrounding lens have a rectangular shape.

In some embodiments, the plurality of refraction lens of the surrounding lens are circular lens with outer refraction lens surrounds inner refraction lens. In other words, the refraction lens form multiple circles like ripples surrounding the central lens.

In some other embodiments, the plurality of refraction lens of the surrounding lens are polygonal lens with outer refraction lens surrounds inner refraction lens. For example, the refraction lens form multiple rectangular shapes one surrounding another.

In some embodiments, the light apparatus also has a housing to fix the LED plate, the driver circuit, the central lens and the surrounding lens to form a downlight device. In other words, the technology not only may be used in spotlight devices but also may be used in downlight or other types of light devices.

DETAILED DESCRIPTION

Figure 1:
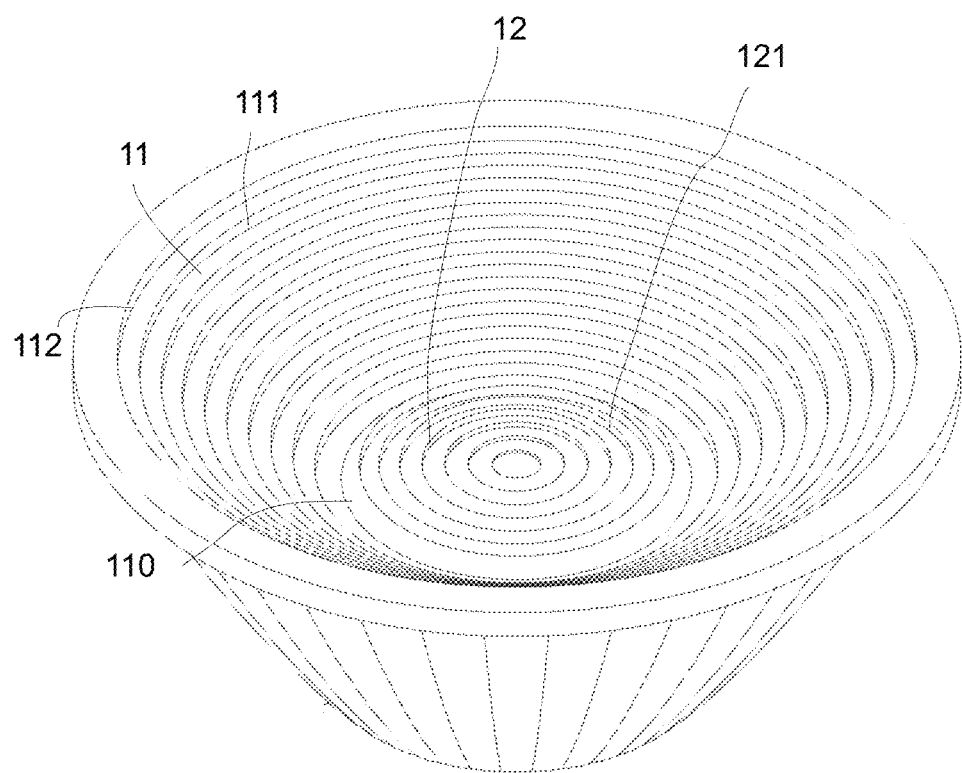
FIG. 1 is a perspective diagram of an lens module embodiment.

Please refer to FIG. 1. FIG. 1 is a perspective diagram of an lens module embodiment.

In FIG. 1, a lens module is illustrated and the lens module has a central lens 12, a surrounding lens 11. The surrounding lens 11 surrounds the central lens 12.

The surrounding lens has a lateral part gradually climbing higher and higher from the internal boundary 110 to the external boundary 112. There are multiple refraction lens 111 arranged on the lateral part. In this example, these refraction lens 111 have circular shapes, parallel to each other. The refraction lens close to the external boundary 112 surrounds the refraction lens near the internal boundary 110 and parallel to each other.

There are also multiple convex lens 121 disposed on the central lens 12. In this example, the convex lens 121 on the central lens 12 and the refraction lens 111 arranged on the lateral part of the surrounding lens 11 all have circular shapes and such configuration makes overall appearance having a nice looking, but please be noted that this is just for example, not to limit the invention scope.

Figure 2:
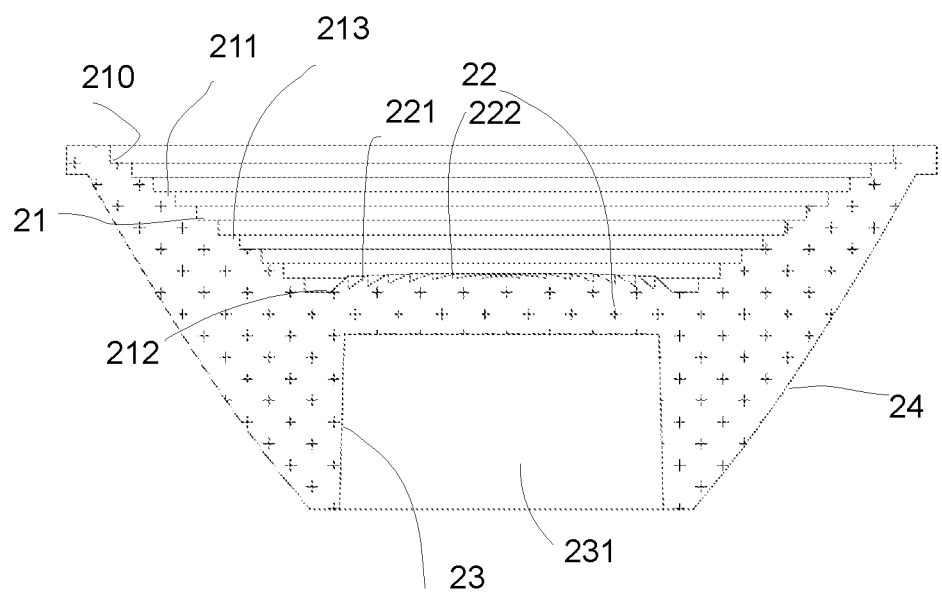
FIG. 2 is a cross-sectional view of a lens module including a central lens and a surrounding lens.

Please refer to FIG. 2. FIG. 2 is a cross-sectional view of a lens module including a central lens and a surrounding lens.

In FIG. 2, it is more clear to see the structure of multiple ladder-shape refraction lens 211, 213 of the surrounding lens 21 arranged one circle after another from the internal boundary 212 to the external boundary 210. The refraction lens 211 close to the external boundary 210 has larger diameter and surrounds the refraction lens 213 close to the internal boundary 212.

In addition, the central lens 22 has multiple convex lens 221, 222. The convex lens 221 away from the middle of the central lens 22 has taller convex height than the convex lens 222 near the middle of the central lens 22.

The lens module also has a cover part 23, defining a containing space for placing a LED plate with a luminous area.

It is also illustrated that the external lateral wall 24 has a gradually enlarger peripheral size from the bottom of the lens module to the top of the lens module, forming a cup shape lens structure.

Figure 3:
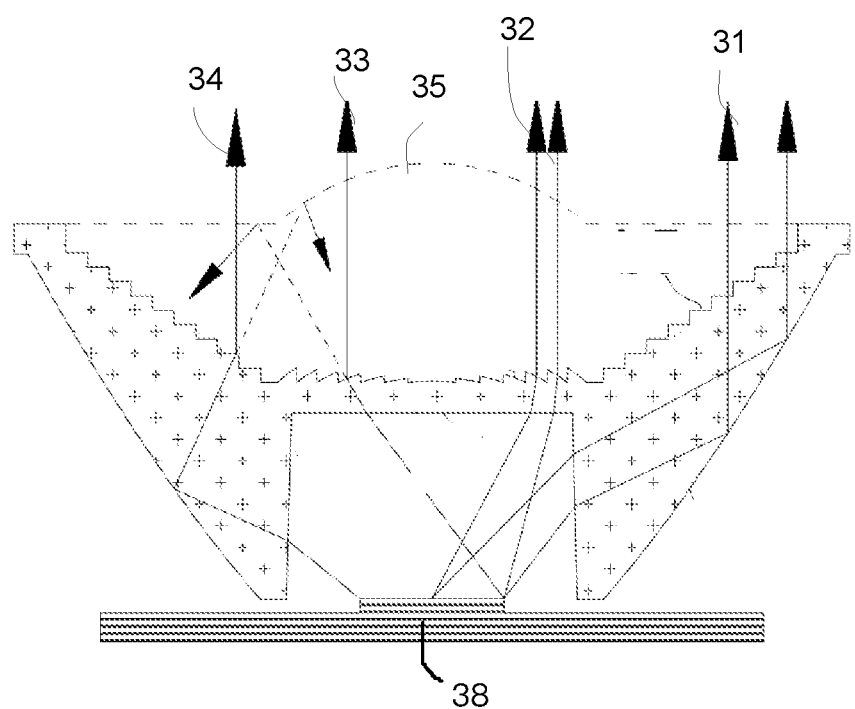
FIG. 3 illustrates light paths in an light apparatus embodiment.

Please refer to FIG. 3. FIG. 3 illustrates light paths in an light apparatus embodiment.

In FIG. 3, a luminous area 38, e.g. LED modules, are placed on a LED plate. The luminous area emits light, unlike a spot light source, to the lens module and have multiple categories of light paths.

The first group of light paths 32 emits from the luminous area 38 to the central lens are adjusted to emit upwardly as illustrated in FIG. 3.

The second group of light paths 31 are light emitted to the lateral wall of the surrounding lens and then reflected upwardly as desired.

The third group of light path 33 and the fourth group of light path 34 show the complexity of light paths. Still the lens modules try to direct maximum light upwardly to form a light beam and prevents unwanted light energy lost.

The dashed line 35 show a virtual lens that may have similar light path but have a larger lens size, causing more material and increasing larger thickness of the light apparatus.

Figure 4:
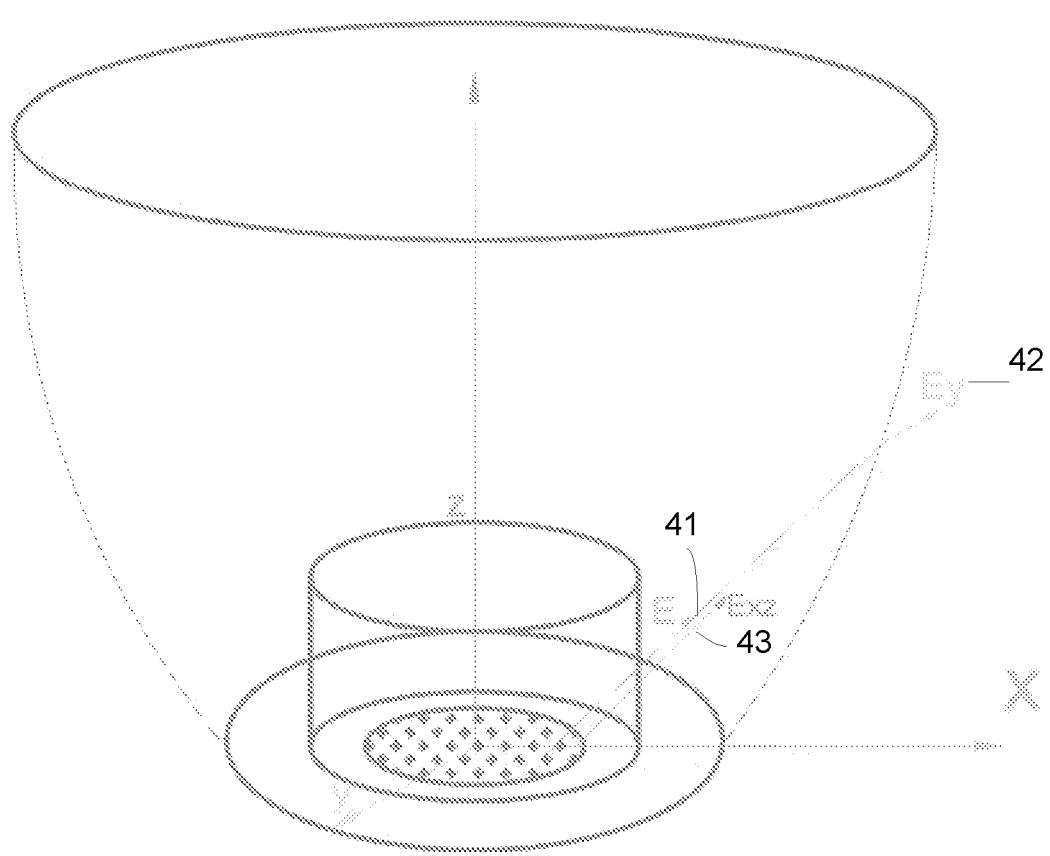
FIG. 4 illustrates light paths for light emitted to lateral surface of a lens module.
Figure 5:
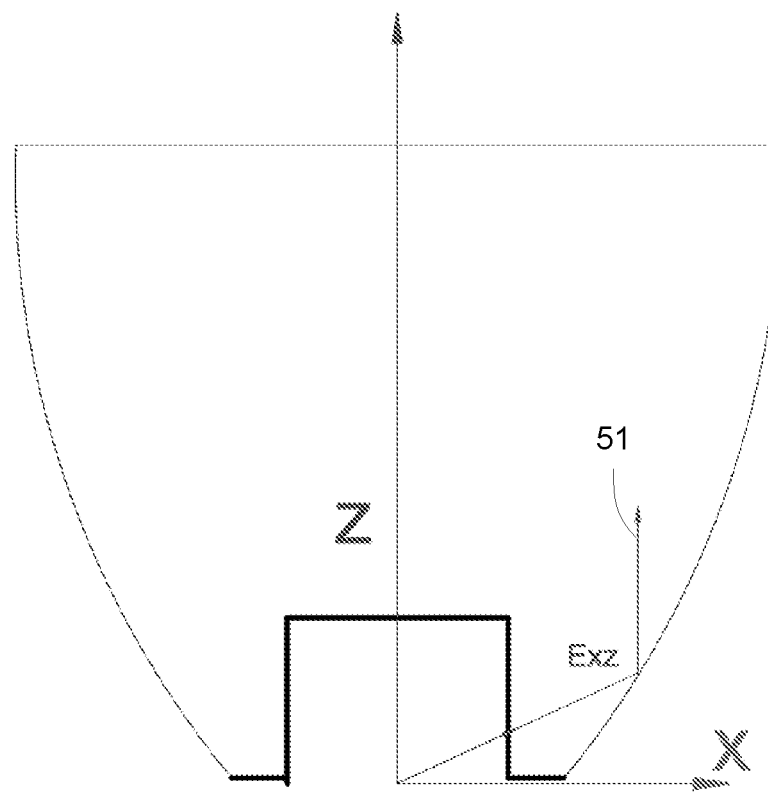
FIG. 5 illustrates a side view for analyzing and explaining light path.
Figure 6:
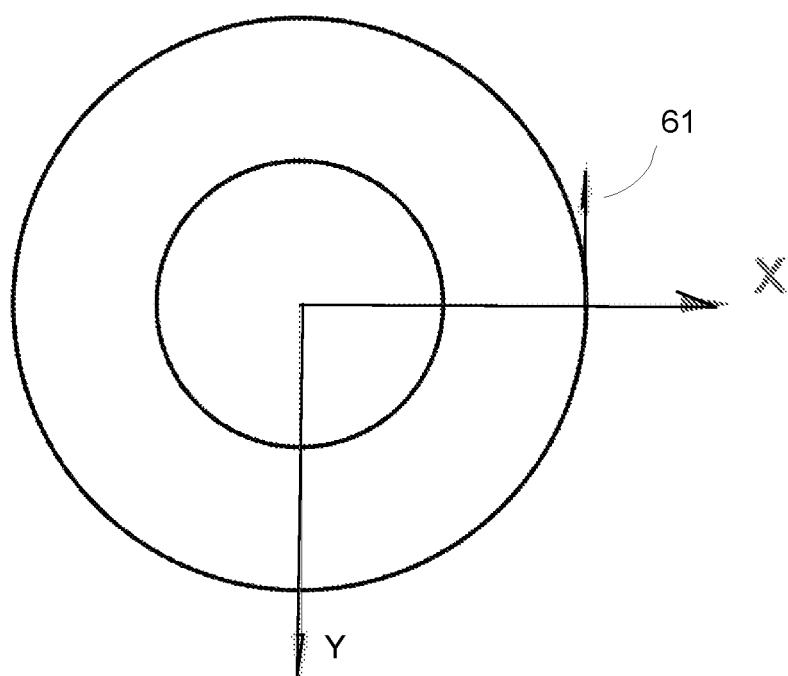
FIG. 6 illustrates a top view of a lens module for analyzing the light path of FIG. 5.

Please see FIG. 4, FIG. 4 and FIG. 5. FIG. 4 illustrates light paths for light emitted to lateral surface of a lens module. FIG. 5 illustrates a side view for analyzing and explaining light path. FIG. 6 illustrates a top view of a lens module for analyzing the light path of FIG. 5.

In FIG. 4, the light emits from the luminous area 41 may be divided to sub-vectors 43 and 44. In FIG. 5, it is illustrated that a light 51 is reflected by the side wall of the surrounding lens. In FIG. 6, it is illustrated that another sub-vector 61 shows light not handled because of the circular external side wall. This sub-vector of light path may be converted in certain amount as unwanted heat and waste certain amount of luminous efficacy.

Figure 7:
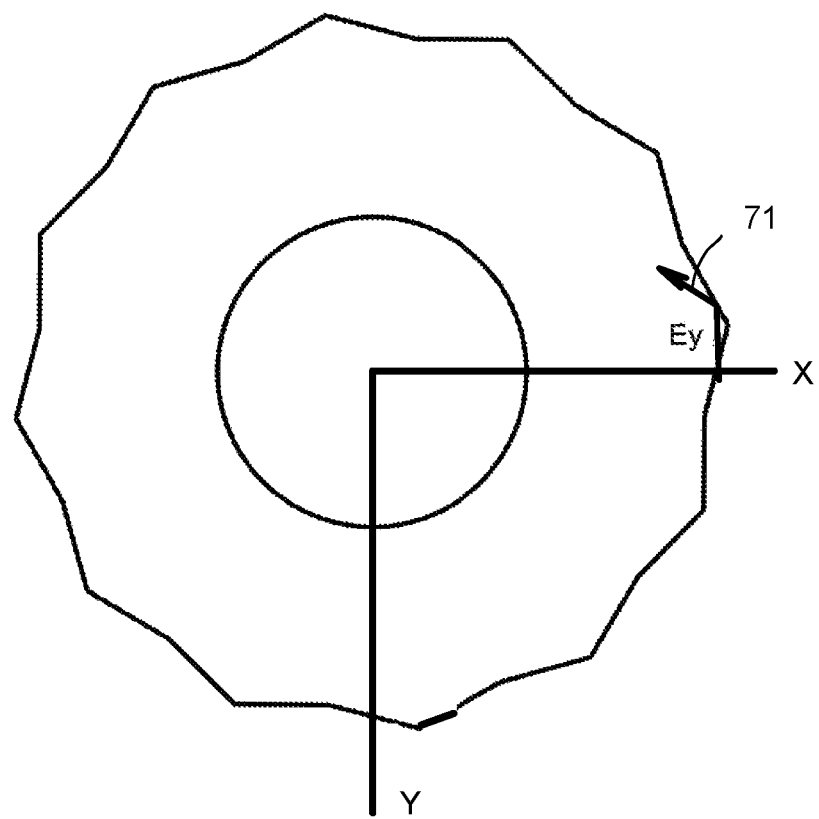
FIG. 7 illustrates an external shape embodiment of a lens module.

Please see FIG. 7. FIG. 7 illustrates an external shape embodiment of a lens module.

In FIG. 7, it is illustrated that multiple concave parts of the external lateral walls form multiple reflection lens for reflecting light of the luminous area back to the lens module. For example, when the external lateral walls have multiple concave parts as exemplified in FIG. 7, the light 71 is successfully reflected and decreases unwanted waste of light.

Figure 8A:
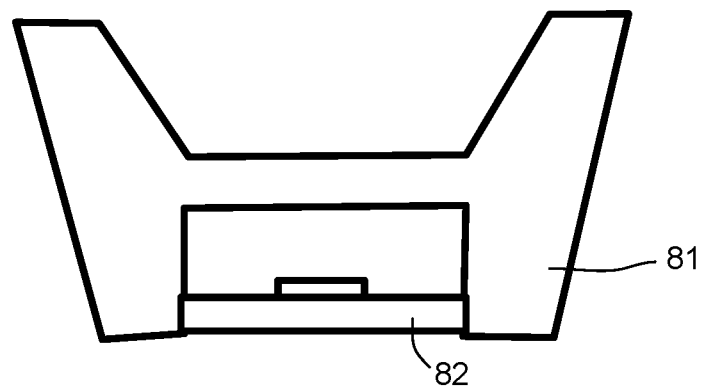
FIG. 8A illustrates a first manufacturing configuration of a light apparatus.
Figure 8B:
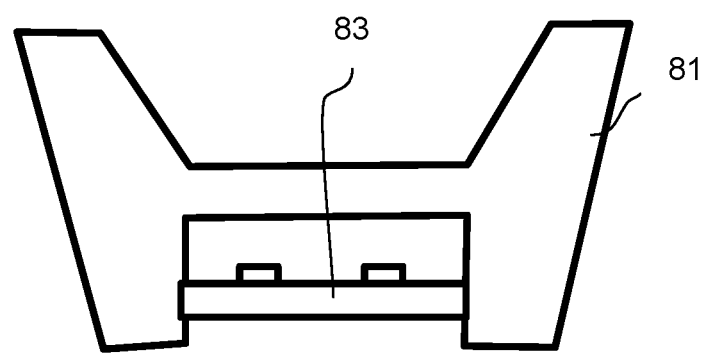
FIG. 8B illustrates another manufacturing configuration of a light apparatus.

Please see FIG. 8A and FIG. 8B. FIG. 8A illustrates a first manufacturing configuration of a light apparatus. FIG. 8B illustrates another manufacturing configuration of a light apparatus.

In FIG. 8A, a lens module 81 is fixed to a LED plate 82 in a first relative position. In FIG. 8B, the same lens module 81 is fixed to another LED plate 83 in a second relative position. By adjusting different fixing position, even the same lens module may provide different output light characteristic, e.g. different light beam angles.

According to an embodiment of the present invention, a light apparatus has a driver circuit, a LED plate, a central lens and a surrounding lens.

The LED plate is connected to the driver circuit for getting a power supply to emit light via a luminous area. The luminous area may refer to a multiple discrete LED modules located in different positions and may also refer to a continuous or multiple continuous areas filled with closely arranged LED modules. Even each LED chip may have a 120 degree emitting angle, when multiple LED chips are put together in an luminous area, the light paths become much more difficult to design, particularly in the case for forming a light beam with desired angle. In addition, even a light beam is generated with a desired beam angle, there may be certain amount of light wasted inside a lens, which may cause additional heat that is easily accumulated and may damage the LED modules or internal circuits to decrease life span of light devices.

In the embodiment, the central lens has a bottom surface and a top surface. The bottom surface faces the luminous area and the top surface is a major part where light from the luminous escapes from the light apparatus.

In addition, the bottom surface of the central lens faces to the luminous area. In some embodiments, the luminous area has smaller size than the bottom surface of the central lens and completely covers under the central lens. In some other embodiments, the central lens has a similar size as the luminous area. In some other embodiments, there are multiple luminous areas and there may be several central lens respectively located above and covering these luminous areas.

The top surface of the central lens has a plurality of convex lens structures for guiding light emitted from the luminous area. In other words, there may be more than one, e.g. a lot of micro lens structure or several, e.g. 5 to 30, convex lens structures arranged on the top surface of the central lens.

The surrounding lens has a surrounding surface connecting to and surrounding the top surface of the central lens. In some embodiments, the surrounding lens surround the central lens. When there are several central lens, the surrounding lens may respectively surround the multiple central lens.

The surrounding surface of the surrounding lens has an internal boundary connected to the top surface of the central lens. The surrounding lens has a lateral part gradually climbing upwardly away from the luminous area to reach an external boundary of the surrounding surface. This means that when the luminous is located below the surrounding lens and the central lens. The surrounding surface of the surrounding lens gets increasing height gradually from internal boundary that surrounds the central lens to the external boundary. In some embodiments, such features form a cup structure In addition, a plurality of refraction lens are disposed on the lateral part for guiding light emitted from the luminous area. In previous cup example, the cup has multiple refraction lens arranged in the inner surface of the cup.

The central lens and the surrounding lens are used for guiding light of the luminous area to form the light beam.

In some embodiments, the multiple lens on the lateral part of the surrounding lens are substantially parallel to each other. For example, multiple refraction lens have similar shape but have different diameters. Refraction lens with larger diameters surrounds the refraction lens with smaller diameters.

In such case, since these refraction lens generally do not have cross points in their extending matter, these refraction lens are substantially parallel to each other. In such embodiments, the plurality of refraction lens are substantially parallel to each other.

In some embodiments, furthermore, the plurality of refraction lens form a plurality of ladders on the surrounding surface of the surrounding lens. In other words, there are ladder-like surrounding structures arranged one circle after another to form a plurality of steps in the lateral part of the surrounding lens.

In some embodiments, the plurality of convex lens of the central lens are substantially parallel to each other. Like mentioned above for surrounding lens, the multiple convex lens may have several parts and each part is parallel to other parts, which means basically there are no cross points between extending manners of these convex lens.

In some embodiments, furthermore, the refraction angles of the convex lens of the central lens arranged away from a middle of the central lens are different from refraction angles of the convex lens of the central lens arranged near the middle of the central lens.

For example, the refraction lens do not have the refraction angles. Instead, their refraction angles are corresponding to their positions relative to the luminous area below for optimizing overall light directions of the light apparatus.

In some embodiments, specifically, the heights of the convex lens of the central lens arranged away from a middle of the central lens are taller than heights of the convex lens of the central lens arranged near the middle of the central lens. For example, if the central lens is a circular shape with a central point. The refraction lens near the central point has lower height, less convex protruding heights, than the refraction lens far from the central point.

In some embodiments, the central lens and the surrounding lens are made of one piece plastic material. In such case, the combination of the central lens and the surrounding lens are made of a single piece component at beginning, e.g. to be made from the same injection molding device. There are currently several ways to manufacture desired luminous efficacy material with transparent plastic material using various manufacturing process, e.g. injection molding, press molding. In addition, the refraction lens and the convex lens on the surrounding lens and the central lens may be cut or generated with other manufacturing tools after making the main module.

In some other embodiments, the central lens and the surrounding lens are two separable modules. In other words, the central lens is combined with the surrounding lens during manufacturing. In such case, a different beam angle is achieved by combining one different central lens and one corresponding surrounding lens. In other words, to meet different light beam characteristic, e.g. different colors, different light beam angle, manufacturers may combine a surrounding lens with a central lens that together meet the required output characteristic.

This may further decrease manufacturing cost, because molding device is always an expensive cost for manufacturers. By using several predetermined standard surrounding lens and central lens, designers may develop various light devices with significant cost reduction.

In some embodiments, the light apparatus further has a cover part below the central lens defining a containing space and surrounding the luminous area in the containing space. For example, there is a cavity defined by cover part at bottom of the lens module facing and surrounding the luminous area.

In some embodiments, there may be a plurality of cover lens disposed on a surface of the cover part. In other words, there may multiple separate luminous areas and each luminous area is surrounded and covered by a corresponding cover part of the lens module.

In some embodiments, the cover part has a position structure to fix to a corresponding fixing unit of the LED plate to align the luminous area at a predetermined position with respect to the central lens and the surrounding lens. It is important to align the luminous area with the lens module so as to maximize the original design effect of the surrounding lens and the central lens, e.g. via adjustment after computer model simulation.

In some embodiments, the position structure has multiple positions to be selected to fix to the corresponding fixing unit of the LED plate to provide different relative distances between the luminous area and the central lens.

In such case, even the same surrounding lens and the central lens as well as the same luminous area are used, the overall light characteristic, like beam angle, may be adjusted by changing the relative position between the surrounding lens and the central lens with the luminous area, e.g. to place the luminous area more close to the central lens.

This helps increase flexibility of the light apparatus. Users may buy the same light apparatus and adjust the light beam to fit their specific needs by changing relative positions with the help for preinstalled position structures.

In some embodiments, the central lens and the surrounding lens form a lens component having an external lateral wall. The external lateral wall has multiple concave parts extended from a bottom of the lens component to a top of the lens component.

For example, when the central lens and surrounding lens are combined or originally as a one-piece component, the component has an external lateral wall. Take the previous cup-shape lens module as an example, the external lateral wall of the cup has multiple concave parts. Each concave part extends from the bottom of the cup and extends to the top of the cup, just like a flower with several petals extended from central of the flower.

In some embodiments, these concave parts of the external lateral walls form multiple reflection lens for reflecting light of the luminous area back to the lens module. In such case, when light emits to the external lateral wall, the light is reflected back to guide the light to go to a desired path to emit out of the light apparatus.

In some embodiments, the light apparatus may have a reflection component attaching and covering the lateral wall of the external lateral wall.

In some embodiments, the reflection component is a heat sink. In other words, the heat sink like a plastic or metal cup surrounds the lens module and helps perform heat dissipation of the lens module.

In some embodiments, the internal boundary and the external boundary of the surrounding lens have different geometric shapes. For example, the central lens may have a circular shape while the external boundary of the surrounding lens have a rectangular shape.

In some embodiments, the plurality of refraction lens of the surrounding lens are circular lens with outer refraction lens surrounds inner refraction lens. In other words, the refraction lens form multiple circles like ripples surrounding the central lens.

In some other embodiments, the plurality of refraction lens of the surrounding lens are polygonal lens with outer refraction lens surrounds inner refraction lens. For example, the refraction lens form multiple rectangular shapes one surrounding another.

In some embodiments, the light apparatus also has a housing to fix the LED plate, the driver circuit, the central lens and the surrounding lens to form a downlight device. In other words, the technology not only may be used in spotlight devices but also may be used in downlight or other types of light devices.

The embodiments mentioned above should not be interpreted as limitation for the present invention. Persons of ordinary skilled in the art would be able to create equivalent designs under protection scopes.

The invention claimed is:

1. A light apparatus for generating a light beam, comprising:
   a driver circuit;
   a LED plate connected to the driver circuit for getting a power supply to emit light via a luminous area of the LED plate;
   a central lens having a bottom surface and a top surface, the bottom surface of the central lens facing to the luminous area, the top surface of the central lens having a plurality of convex lens structures for guiding light emitted from the luminous area; and
   a surrounding lens having a surrounding surface connecting to and surrounding the top surface of the central lens, the surrounding surface of the surrounding lens having an internal boundary connected to the top surface of the central lens and the surrounding lens having a lateral part gradually climbing upwardly away from the luminous area to reach an external boundary of the surrounding surface, a plurality of refraction lens being disposed on the lateral part for guiding light emitted from the luminous area,
   wherein the central lens and the surrounding lens being used for guiding light of the luminous area to form the light beam, the central lens and the surrounding lens are two separable modules, and a different beam angle is achieved by combining one different central lens and one corresponding surrounding lens.

2. The light apparatus of claim 1, wherein the plurality of refraction lens are substantially parallel to each other.

3. The light apparatus of claim 2, wherein the plurality of refraction lens form a plurality of ladders on the surrounding surface of the surrounding lens.

4. The light apparatus of claim 1, wherein the plurality of convex lens of the central lens are substantially parallel to each other.

5. The light apparatus of claim 4, wherein refraction angles of the convex lens of the central lens arranged away from a middle of the central lens are different from refraction angles of the convex lens of the central lens arranged near the middle of the central lens.

6. The light apparatus of claim 5, wherein heights of the convex lens of the central lens arranged away from a middle of the central lens are taller than heights of the convex lens of the central lens arranged near the middle of the central lens.

7. The light apparatus of claim 1, further comprising a cover part below the central lens defining a containing space and surrounding the luminous area in the containing space.

8. The light apparatus of claim 7, wherein there are a plurality of cover lens disposed on a surface of the cover part.

9. The light apparatus of claim 7, wherein the cover part has a position structure to fix to a corresponding fixing unit of the LED plate to align the luminous area at a predetermined position with respect to the central lens and the surrounding lens.

10. The light apparatus of claim 9, wherein the position structure has multiple positions to be selected to fix to a corresponding fixing unit of the LED plate to provide different relative distances between the luminous area and the central lens.

11. The light apparatus of claim 1, wherein the central lens and the surrounding lens form a lens component having an external lateral wall, the external lateral wall having multiple concave parts extended from a bottom of the lens component to a top of the lens component.

12. The light apparatus of claim 11, wherein the multiple concave parts of the external lateral walls form multiple reflection lens for reflecting light of the luminous area back to the lens module.

13. The light apparatus of claim 11, further comprising a reflection component attaching and covering a lateral wall of the external lateral wall.

14. The light apparatus of claim 13, wherein the reflection component is a heat sink.

15. The light apparatus of claim 1, wherein the internal boundary and the external boundary of the surrounding lens have different geometric shapes.

16. The light apparatus of claim 1, wherein the plurality of refraction lens of the surrounding lens are circular lens with an outer refraction lens surrounding an inner refraction lens.

17. The light apparatus of claim 1, wherein the plurality of refraction lens of the surrounding lens are polygonal lens with outer refraction lens surrounds inner refraction lens.

18. The light apparatus of claim 1, further comprising a housing to fix the LED plate, the driver circuit, the central lens and the surrounding lens to form a downlight device.

* * * * *